US008760115B2

(12) United States Patent
Kinser et al.

(10) Patent No.: US 8,760,115 B2
(45) Date of Patent: Jun. 24, 2014

(54) METHOD FOR CHARGING A PLUG-IN ELECTRIC VEHICLE

(75) Inventors: Christopher A. Kinser, Grand Blanc, MI (US); Don K. St. John, Livonia, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 598 days.

(21) Appl. No.: 12/544,585

(22) Filed: Aug. 20, 2009

(65) Prior Publication Data

US 2011/0043165 A1 Feb. 24, 2011

(51) Int. Cl.
- H02J 7/00 (2006.01)
- H02J 3/14 (2006.01)
- B60W 10/24 (2006.01)

(52) U.S. Cl.
USPC ............................ 320/109; 307/32; 180/65.29

(58) Field of Classification Search
USPC ....................................... 320/109; 307/35, 32
See application file for complete search history.

(56) References Cited

U.S. PATENT DOCUMENTS

| | | | | |
|---|---|---|---|---|
| 5,467,006 A | * | 11/1995 | Sims | 237/5 |
| 6,225,776 B1 | * | 5/2001 | Chai | 320/109 |
| 6,876,098 B1 | * | 4/2005 | Gray, Jr. | 290/40 D |
| 7,256,516 B2 | * | 8/2007 | Buchanan et al. | 307/62 |
| 7,562,234 B2 | * | 7/2009 | Conroy et al. | 713/300 |
| 7,598,702 B2 | * | 10/2009 | Walrath | 320/107 |
| 7,826,939 B2 | * | 11/2010 | Liu et al. | 701/22 |
| 7,847,518 B2 | * | 12/2010 | Ichikawa et al. | 320/109 |
| 7,948,207 B2 | * | 5/2011 | Scheucher | 320/104 |
| 2007/0090810 A1 | * | 4/2007 | Dickinson et al. | 320/150 |
| 2008/0218104 A1 | * | 9/2008 | Lukic et al. | 318/139 |
| 2009/0001937 A1 | * | 1/2009 | Densham et al. | 320/145 |
| 2009/0108803 A1 | * | 4/2009 | Singarajan et al. | 320/105 |
| 2009/0115251 A1 | * | 5/2009 | Nakamura et al. | 307/32 |
| 2009/0150015 A1 | * | 6/2009 | Okubo et al. | 701/22 |
| 2010/0152915 A1 | * | 6/2010 | Nakagawa | 700/296 |
| 2010/0161482 A1 | * | 6/2010 | Littrell | 705/40 |
| 2010/0289451 A1 | * | 11/2010 | Tuffner et al. | 320/109 |
| 2010/0314942 A1 | * | 12/2010 | Talkin et al. | 307/41 |
| 2011/0046828 A1 | * | 2/2011 | Chander et al. | 701/22 |
| 2011/0066311 A1 | * | 3/2011 | Itagaki | 701/22 |

FOREIGN PATENT DOCUMENTS

WO  WO 2009/157898  *  6/2008

OTHER PUBLICATIONS

German Office Action dated Jun. 7, 2011, (4 pages).

* cited by examiner

*Primary Examiner* — Drew A Dunn
*Assistant Examiner* — Nathaniel Pelton
(74) *Attorney, Agent, or Firm* — Lionel D. Anderson; Reising Ethington P.C.

(57) ABSTRACT

A system and method for charging a plug-in electric vehicle with an external power source, even when the overall power requested by the plug-in electric vehicle exceeds the overall power available from the external power source. In an exemplary embodiment, a method determines the overall power requested by one or more vehicle systems, and then compares that to the overall available power from the external power source. If the overall requested power exceeds the overall available power, then the power from the external power source is allocated or apportioned to the different vehicle systems according to an allocation process that may consider factors like predetermined priorities and current vehicle conditions.

21 Claims, 2 Drawing Sheets

METHOD FOR CHARGING A PLUG-IN ELECTRIC VEHICLE

TECHNICAL FIELD

The present invention generally relates to allocating electrical power and, more particularly, to a system and method that allocates electrical power during a charging process for a plug-in electric vehicle.

BACKGROUND

A plug-in electric vehicle may require electricity in between vehicle uses or operation in order to charge its rechargeable battery pack. In most applications, a battery charger receives power from an external power source such as a 110V or 220V AC power outlet, and then rectifies and/or transforms the power to a form and level that is suitable for charging the rechargeable battery pack that resides on the plug-in electric vehicle.

During the charging process, other vehicle systems—like a vehicle heating, ventilation and air conditioning (HVAC) system—may also request electrical power from the external power source. In some instances, the amount of power requested exceeds the amount of power available; put differently, the external power source may not have enough power to satisfy all of the requests that are being made by the different vehicle systems, including charging the rechargeable battery pack.

SUMMARY

According to one embodiment, there is provided a method for charging a plug-in electric vehicle with an external power source. The method may comprise the steps of: (a) determining an overall available power; (b) determining an overall requested power; and (c) determining if the overall requested power exceeds the overall available power, and if the overall requested power does exceed the overall available power then allocating the overall available power from the external power source to the plurality of vehicle systems.

According to another embodiment, there is provided a method for charging a plug-in electric vehicle with an external power source. The method may comprises the steps of: (a) determining an overall available power; (b) determining an overall requested power; and (c) determining if the overall requested power exceeds the overall available power, and if the overall requested power does exceed the overall available power then distributing the overall available power to the plurality of vehicle systems. The amount of power that is distributed to each of the plurality of vehicle systems may be influenced by a predetermined priority and/or a current vehicle condition.

BRIEF DESCRIPTION OF THE DRAWINGS

Preferred exemplary embodiments of the invention will hereinafter be described in conjunction with the appended drawings, wherein like designations denote like elements, and wherein.

DETAILED DESCRIPTION OF THE PREFERRED EMBODIMENTS

The system and method described below may be used to charge a plug-in electric vehicle with an external power source, and may do so even when the overall power requested by the plug-in electric vehicle exceeds the overall power available from the external power source. In an exemplary embodiment, the system and method determine the overall power requested by one or more high voltage vehicle systems, and then compare that to the overall available power from the external power source. If the overall requested power exceeds the overall available power, then the power from the external power source is allocated or apportioned to the different high voltage vehicle systems according to a process or technique that may consider factors like predetermined priorities and current vehicle conditions, for example.

Figure 1:
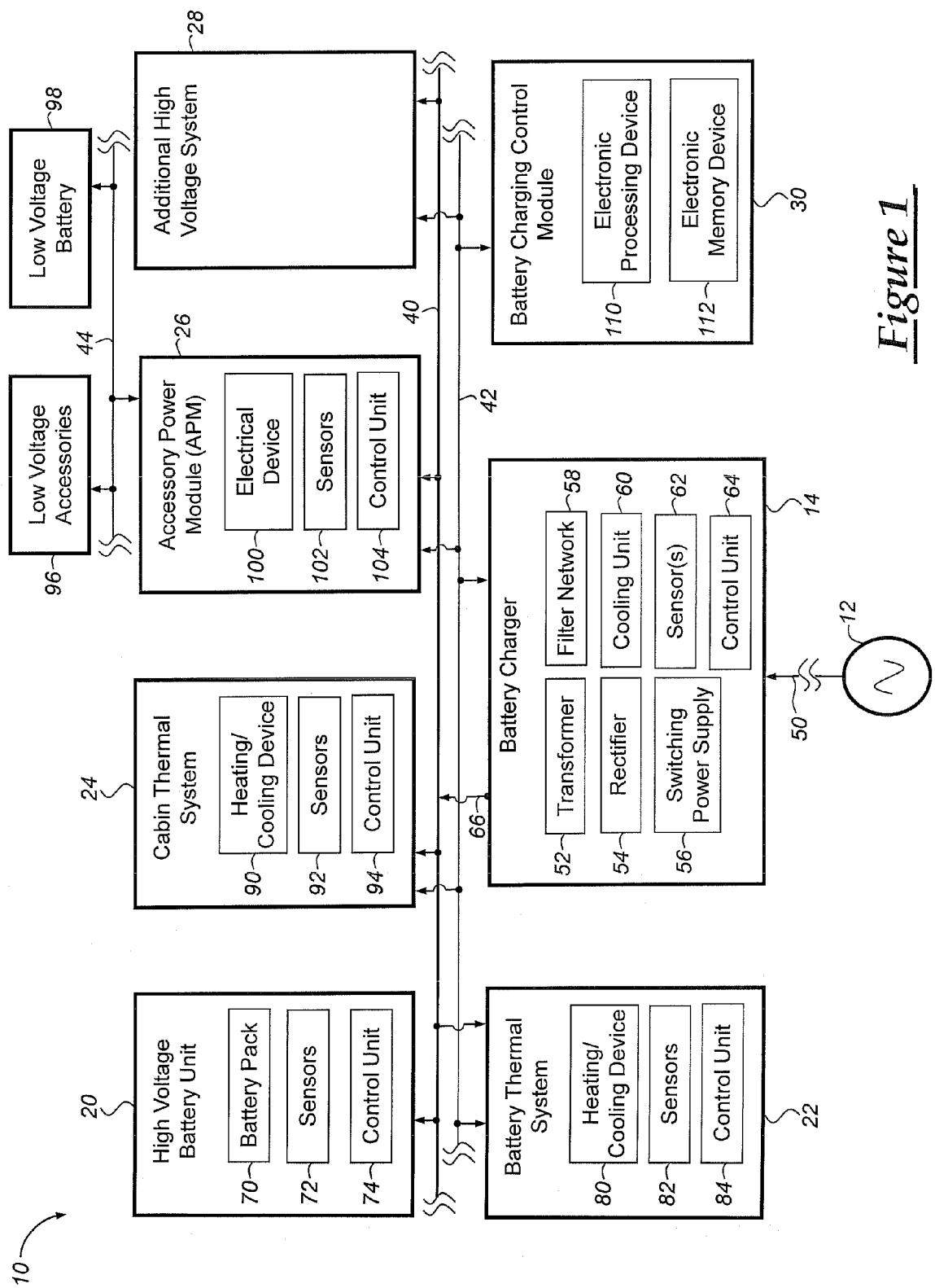
FIG. 1 is a block diagram of an exemplary system for charging a vehicle battery, such as those found on a plug-in electric vehicle.

With reference to FIG. 1, there is shown an exemplary battery charging system 10 for a plug-in electric vehicle that allocates electrical power between one or more high voltage vehicle systems or devices. The term "plug-in electric vehicle" broadly includes any type of vehicle that has an energy storage device that assists with vehicle propulsion, such as a rechargeable battery pack, and can be connected to and charged by an external power source. Some examples of plug-in electric vehicles include, but are certainly not limited to, plug-in hybrid electric vehicles (PHEV) which include both an internal combustion engine and an electric motor in the vehicle powertrain, as well as battery electric vehicles (BEVs) which solely rely upon an electric motor for vehicle propulsion. Although the following description is provided in the context of an exemplary PHEV, it should be appreciated that the present system and method can be used with any type of plug-in electric vehicle and are not limited to use with the exemplary embodiment described herein.

According to this particular embodiment, battery charging system 10 includes an external power source 12, a battery charger 14, a number of high voltage vehicle systems (e.g., a high voltage battery unit 20, a battery thermal system 22, a cabin thermal system 24, an accessory power module 26, and one or more additional high voltage systems 28), and a battery charging control module 30. A circuit, bus or other suitable high voltage connection 40 may be used to provide electrical power from battery charger 14 to the different vehicle systems 20-28, while a circuit, bus or other suitable low voltage connection 42 may be used to exchange information, data, messages, or otherwise communicate between the various systems and devices. All of the devices and systems shown in FIG. 1, with the exception of external power source 12, may be fixedly mounted and located on the plug-in electric vehicle.

External power source 12 provides battery charging system 10 with electrical power over a power coupling 50, and may be one of a number of different power supply types known in the art. For example, external power source 12 can be a standard AC power outlet that provides electricity at 110V, 220V or any other suitable voltage level, or it can be a portable generator such as the type that runs on natural gas, propane, gasoline, diesel, or the like. In one embodiment, external power source 12 is a renewable power source, such as a remote charging station powered by energy from solar panels, wind turbines, hydroelectric means, biomass, etc. External power source 12 may be connected to battery charger 14 in one of a variety of different ways, including via conductive connections (e.g., power coupling 50), inductive connections, as well as other connections known in the art. In an exemplary embodiment, power coupling 50 is a specialized vehicle power coupling (such as those described in specifications SAE J-1772 and J-1773), and includes a first end for connecting to a standard AC power outlet and a second end for connecting to the plug-in electric vehicle. This enables a user to easily connect and disconnect the plug-in electric vehicle from a common AC power outlet, such as those found in most homes and garages. Skilled artisans will appreciate that the system and method described herein are not limited to any particular external power source, as a number of different power source types could be used.

Battery charger 14 is connected to both external power source 12 and high voltage circuit 40, and provides electrical power to one or more of the vehicle systems 20-28 according to charging control signals from battery charging control module 30. According to an exemplary embodiment, battery charger 14 is a programmable charger that is mounted in the plug-in electric vehicle and includes a transformer 52, a rectifier 54, a switching power supply 56, a filter network 58, a cooling unit 60, one or more sensors 62, a control unit 64, and any other suitable components known in the art.

Depending on the particular arrangement, transformer 52 steps-up and/or steps-down the input voltage from external power source 12 to a different and, in some cases, programmable output voltage. Rectifier 54 rectifies the AC signal into a DC signal and may include a half-wave, full-wave or other type of known rectifying arrangement. Switching power supply 56 takes the rectified signal and, according to one embodiment, rapidly switches a power transistor or other switch between saturation ('on') and cutoff ('off') according to a variable duty cycle whose average corresponds to the desired output voltage. In this way, switching power supply 56 may control the amount of current, and hence the output power, that is provided by battery charger 14 to high voltage circuit 40. Filter network 58, which is optional, may include any combination of electrical components that can be used to filter, process, or otherwise condition the output voltage before providing it to high voltage circuit 40. Cooling unit 60, also an optional component, may use any combination of fans, water jackets, heat sinks, or other suitable cooling means to reduce the temperature of battery charger 14 during charging. Although not shown here, battery charger 14 could have multiple power outputs including a high voltage output 66 connected to high voltage circuit 40 and a lower voltage output (not shown) connected to a low voltage circuit that includes a low voltage battery, for example.

Battery charger sensors 62 may include any combination of hardware and/or software components capable of monitoring battery charger conditions such as charger temperature, charger input voltage (typically an AC voltage), charger output voltage (typically a DC Voltage), charger current, etc. Depending on the particular embodiment, these sensors may be integrated within battery charger 14, they may be external sensors located outside of the battery charger, or they may be provided according to some other known arrangement. A charger temperature sensor may sense the temperature of one or more components within battery charger 14, including the temperature of the least efficient component; that is, the component of the battery charger that exhibits the most heat. Battery charger sensors 62 may be coupled directly to control unit 64, or they could be coupled to any number of other devices, components, modules, etc., including some located outside of battery charger 14, like battery charging control module 30.

Control unit 64 may include any variety of electronic processing devices, memory devices, input/output (I/O) devices, and other known components, and may perform various control and/or communication related functions. For example, control unit 64 could receive sensor signals from the various battery charger sensors 62, package the sensor signals into an appropriate sensor message, and send the sensor message to battery charging control module 30 over low voltage bus 42, which may be a CAN bus, a system management bus (SMBus), a proprietary communication link, or any other communication means known to those skilled in the art. In another capacity, control unit 64 may receive charging control signals or other instructions from battery charging control module 30 or some other device, interpret the instructions, and execute the instructions by correspondingly controlling devices within battery charger 14. For instance, if battery charging control module 30 sends a charging control signal to battery charger 14, then control unit 64 can use the charging control signal to manipulate the pulse width modulated (PWM) duty-cycle of switching power supply 56. This, in turn, causes switching power supply 56 to alter the amount of current, and ultimately the amount of output power, that is provided by battery charger 14 to one or more of the vehicle systems 20-28. These are, of course, only some of the possible arrangements and functions of control unit 64, as others are certainly possible.

High voltage battery unit 20 provides the plug-in electric vehicle with electrical power and, depending on the particular embodiment, may be the primary electrical power source for the vehicle or may be used in conjunction with another power source for power supplementation purposes, to cite two examples. Many different battery types and arrangements may be used, including the exemplary one schematically shown here which includes a battery pack 70, one or more battery sensors 72, and a control unit 74. Battery pack 70 may include a collection of identical or individual battery cells connected in series, parallel, or a combination of both in order to deliver a desired voltage, amperage, capacity, power density, and/or other performance characteristics. Generally, it is desirable to provide high power and energy densities, which has led to the development and use of many types of batteries including chemical, non-chemical, and others. Some examples of suitable battery types include all types of lithium-ion (e.g., lithium iron phosphate, lithium nickel manganese cobalt, lithium iron sulfide, lithium polymer, etc.), lead-acid, advanced lead-acid, nickel metal hydride (NiMH), nickel cadmium (NiCd), zinc bromide, sodium nickel chloride (NaNiCl), zinc air, vanadium redox, and others. The battery pack 70 may provide approximately 40-600V, depending on its particular design and application. For example, a heavy truck using a two-mode hybrid system may require a high voltage battery pack capable of providing about 350V, where a lighter vehicle may only need about 200V. In another embodiment, the battery charging system 10 may be part of a belt-alternator-starter (BAS) or BAS-plus type system and thus only require a battery pack that provides about 40-110V. In any case, battery pack 70 should be designed to withstand repeated charge and discharge cycles and to receive electrical energy from external power source 12. Skilled artisans will appreciate that the system and method described herein are not limited to any one particular type of battery or battery arrangement, as a number of different battery types could be employed.

Battery sensors 72 may include any combination of hardware and/or software components capable of monitoring battery conditions such as battery temperature, battery voltage, battery current, battery state of charge (SOC), battery state of health (SOH), etc. These sensors may be integrated within high voltage battery unit 20 (e.g., an intelligent or smart battery), they may be external sensors located outside of the battery unit, or they may be provided according to some other known arrangement. The battery temperature sensors may monitor and determine the battery temperature on a cell-by-cell basis, as an average or collective temperature of a block of cells or a region of the battery unit, as the average or collective temperature of the entire battery unit, or according to some other temperature determining method known in the art. Measuring battery temperature on an individual cell basis may be beneficial if, for example, the middle cells exhibit different temperatures than the edge or boundary cells of battery pack 70. The same principal of determining battery temperature on a cell-by-cell, collective or other basis also applies to battery voltage, battery current, battery SOC, battery SOH, etc. Output from battery sensors 72 may be provided to control unit 74, battery charging control module 30, or some other appropriate device.

Control unit 74 may include any variety of electronic processing devices, memory devices, input/output (I/O) devices, and other known components, and may perform various control and/or communication related functions. For example, control unit 74 could receive sensor signals from the various battery sensors 72, package the sensor signals into an appropriate sensor message, and send the sensor message to battery charging control module 30 over low voltage bus 42. It is possible for control unit 74 to gather battery sensor readings and store them in local memory so that a comprehensive sensor message can be provided to battery charger control module 30 at a later time, or the sensor readings can be forwarded to module 30 or some other destination as soon as they arrive at control unit 74, to cite a few possibilities. Instead of sending the battery sensor readings to battery charger control module 30 for subsequent processing, it is possible for control unit 74 to process or analyze the sensor readings itself. In another capacity, control unit 74 can store pertinent battery characteristics and background information pertaining to the battery's cell chemistry, cell capacity, upper and lower battery voltage limits, battery current limits, battery temperature limits, temperature profiles, battery impedance, number or history of charge/discharge events, etc.

Battery thermal system 22 is thermally coupled to battery charger 14 and/or high voltage battery unit 20 so that it can manage, control or otherwise manipulate aspects of the environment that can affect the performance of those devices. For example, battery thermal system 22 may include a cooling and/or heating device that can lower or raise the temperature of high voltage battery unit 20. Skilled artisans will appreciate that the charging and discharging performance, the life span, as well as other characteristics of a battery pack may be influenced by temperature. When starting a vehicle in an extremely cold environment, for example, battery thermal system 22 can use a heating device to warm up battery pack 70 to a temperature that is better suited for charging, discharging, etc. Conversely, battery thermal system 22 may include a cooling device, like a fan, to reduce the temperature of battery pack 70 during charging, discharging, etc. so that it is maintained at a lower and more desirable temperature. According to an exemplary embodiment, battery thermal system 22 includes one or more heating/cooling devices 80, sensors 82, and a control unit 84. Some examples of a suitable heating/cooling device 80 include: fans, water jackets, air passages, heat sinks, thermoelectric coolers (e.g., Peltier devices), internal resistive heating, condensers, or some combination thereof. The heating/cooling device 80 may include passive devices (e.g., devices that rely on the non-heated and non-cooled ambient environment to manipulate temperature), active devices (e.g., devices that actively add or remove heat from the system to manipulate temperature), or both. The sensors 82 and control unit 84 that are included within battery thermal system 22 may be similar to those included within battery charger 14 and/or high voltage battery unit 20; thus, the previous description of those components applies here as well. It is also possible for battery thermal system 22 to rely on the sensor readings and other information from sensors 62 and/or 72, in which case sensors 82 may be omitted.

Battery thermal system 22 may include components that are thermally coupled with battery charger 14; this could be in addition to or in lieu of those that are thermally coupled to high voltage battery unit 20. Although battery charger 14 is schematically shown having its own cooling unit 60, it is possible for the cooling and/or heating devices that regulate the temperature of the battery charger to be included within battery thermal system 22. It therefore does not matter whether the cooling and/or heating devices are specifically bundled within battery charger 14, high voltage battery unit 20, or battery thermal system 22; they will henceforth be treated as if they are a part of battery thermal system 22, whether or not they physically reside there. According to the exemplary embodiment shown here, battery thermal system 22 is connected to high voltage circuit 40 so that it can receive high voltage electrical power from battery charger 14, and is connected to low voltage bus 42 so that it can send messages and exchange information with other devices in the system, like battery charging control module 30. Other connections and arrangements are possible, as this is only one potential.

Cabin thermal system 24 is thermally coupled with the cabin or interior of the plug-in electric vehicle so that it can manage, control or otherwise manipulate aspects of the environment within that space. For instance, cabin thermal system 24 may include the vehicle's heating, ventilation and air conditioning (HVAC) system which manipulates the environmental conditions—thermal and otherwise—within the vehicle cabin. In an exemplary embodiment, cabin thermal system 24 includes one or more heating/cooling devices 90, sensors 92, and a control unit 94. Heating/cooling devices 90 include any device or component that is capable of influencing or affecting the environment within the vehicle cabin. This may include, for example, heaters, air conditioners, seat heaters, steering wheel heaters, fans, etc. The sensors 92 and control unit 94 that are included within cabin thermal system 24 may be similar to those included within battery charger 14 and/or high voltage battery unit 20; thus, the previous description of those components applies here as well. According to this particular embodiment, cabin thermal system 24 is connected to high voltage circuit 40 so that it can receive high voltage electrical power from battery charger 14, and is connected to low voltage bus 42 so that it can send messages and exchange information with other devices in the system, like battery charging control module 30. Other connections and arrangements are possible, as this is only one potential.

Accessory power module (APM) 26 couples or connects high and low voltage circuits within the vehicle, and may perform a number of different functions in that capacity. For instance, APM 26 may include a step-down transformer and other electrical components for stepping-down the voltage on the high voltage circuit 40 (e.g., a voltage of 350V) to the lower level of low voltage circuit 44 (e.g., a voltage of 12V or 42V). Thus, APM 26 can provide a steady and dependable source of low voltage DC power to the components of low voltage circuit 44; this includes, for example, accessories 96 (e.g., a radio receiver, DVD player, television, telematics unit and/or other infotainment devices, as well as vehicle interior and exterior lights, auxiliary power plugs, power doors and windows, etc.), low voltage battery 98 (e.g., a conventional 12V lead-acid battery), various modules and control units (e.g., battery charging control module 30 and control units 64,

74, 84, 94 that require low voltage DC power for operation), as well as any other component, device, system, etc. that requires low voltage power. In an exemplary embodiment, APM 26 includes one or more electrical devices 100 (e.g., a transformer for stepping down power from high voltage circuit 40 to low voltage circuit 44), sensors 102, and a control unit 104. Electrical device 100 is not limited to a transformer, as it may include any electrical device used in coupling or providing power between high and low voltage circuits 40 and 44. The sensors 102 and control unit 104 that are included within APM 26 may be similar to those included within battery charger 14 and/or high voltage battery unit 20; thus, the previous description of those components applies here as well. It is also possible for APM 26 to be combined or otherwise integrated with other components in the plug-in electric vehicle.

Additional high voltage system(s) 28 broadly includes all other components, devices, modules, systems, etc. in the vehicle that are connected to high voltage circuit 40 and require high voltage electrical power for operation. Some examples of potential additional high voltage systems include ride height systems, engine block heaters, hydraulic pumps, vacuum pumps, active engine mounts, electric power steering systems, electric winches, etc. It should be appreciated that the terms "high voltage" and "low voltage" are not limited to any particular voltage rating. Instead, these terms are relative in that high voltage circuit 40 (the circuit within the plug-in electric vehicle that is connected to, among other items, the battery unit used for vehicle propulsion) generally has a higher voltage than low voltage circuit 44 (the circuit that provides power to low voltage accessories 96 and may be connected to a 12V battery or the like). Therefore, while some preferred voltage ratings and ranges are provided above for purposes of illustration, the system and method described herein are not limited to such embodiments.

Battery charging control module 30 monitors various conditions throughout the plug-in electric vehicle and uses these conditions to control certain aspects of the charging process. Depending on the particular embodiment, battery charging control module 30 may be a stand-alone vehicle electronic module, it may incorporated or included within another vehicle electronic module (e.g., a hybrid control module), or it may be part of a larger network or system (e.g., a battery management system (BMS), a vehicle energy management system, etc.), to name a few possibilities. Battery charging control module 30 may perform a number of functions pertaining to battery charging system 10; these could include, for example, battery charging, power allocation, cell protection, charge control, demand management, SOC and SOH determination, cell balancing, history logging, communications, etc.

Battery charging control module 30 may include any variety of electronic processing devices, memory devices, input/output (I/O) devices, and other known components, and may perform various control and/or communication related functions. The battery charging control module 30 can be electronically connected to other vehicle devices and modules via low voltage bus 42 or some other suitable vehicle communications network, and can interact with them when required. In an exemplary embodiment, battery charging control module 30 includes an electronic processing device 110 (e.g., a microprocessor, a microcontroller, an application specific integrated circuit (ASIC), etc.) that executes instructions for software, firmware, programs, algorithms, scripts, etc. that are stored in an electronic memory device 112 and may govern the battery charging processes and methods described herein. Battery charging control module 30 could also store or maintain look up tables or other data structures, various sensor readings (e.g., sensor readings from sensors 62, 72, 82, 92, 102, etc.), and predetermined values used by one or more algorithms, for example. These are, of course, only some of the possible functions and capabilities of battery charging control module 30, as other embodiments could also be used.

As explained above, the exemplary battery charging system 10 shown in FIG. 1 is only a general and schematic illustration of one potential system. The system and method described herein may be used with any number of plug-in electric vehicles and is not limited to the specific embodiments shown here. For example, battery charging system 10 could include a combination of vehicle systems that differs from that shown in FIG. 1; the combination could include more, less or different vehicle systems than the exemplary devices 20-28. Moreover, it is not necessary that all of the exemplary devices 20-28 have the sensors, control units and other components that were previously described and shown in FIG. 1. It is possible for these and other components to be removed from or added to the exemplary devices 20-28.

Figure 2:
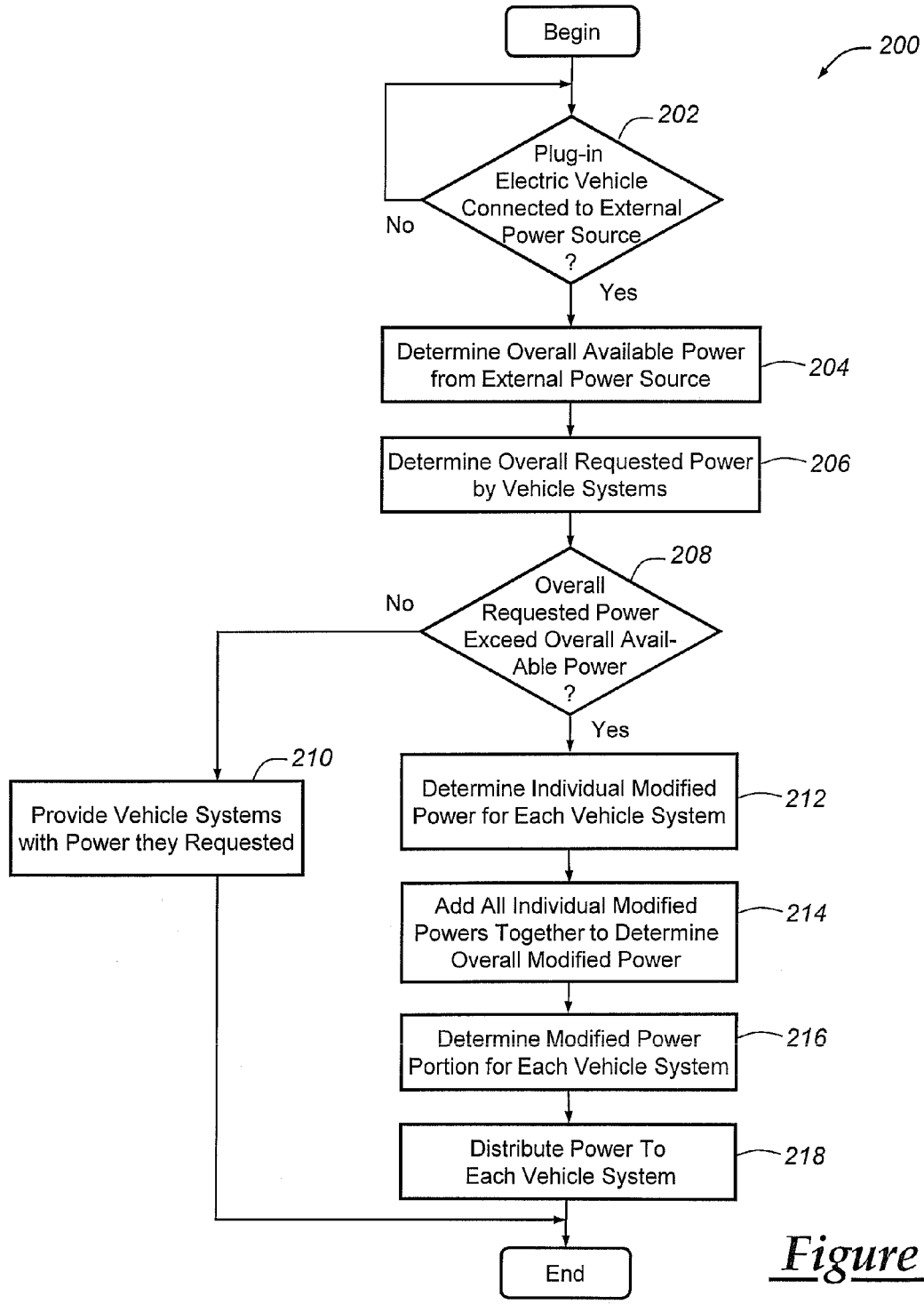
FIG. 2 is a flowchart illustrating an exemplary method for charging a vehicle battery, and may be used with the exemplary system shown in FIG. 1.

Turning to FIG. 2, there is shown an exemplary method 200 for allocating or distributing electrical power during a charging process for a plug-in electric vehicle. The method may use various readings, conditions, information, comparisons, calculations, etc. to allocate power among the vehicle systems 20-28 in an optimum fashion. In an exemplary embodiment, the system and method determine the overall power requested by vehicle systems 20-28, and then compare that to the overall available power from external power source 12. If the overall requested power exceeds the overall available power, then the power from external power source 12 is allocated or apportioned to the different vehicle systems 20-28 in an optimum fashion based on the process or technique described below. A number of different factors and considerations may influence what constitutes an "optimum fashion".

For example, an optimum process may strive to charge high voltage battery unit 20 in the shortest time possible. In such a case, a greater portion of the overall available power may be diverted to high voltage battery unit 20 as opposed to the other vehicle systems 22-28. In a different example, an optimum process may involve charging high voltage battery unit 20 in a manner that best extends its battery life (e.g., slow charging the battery). This scenario may involve providing high voltage battery 20 with a lesser portion of the overall available power while simultaneously sending power to battery thermal system 22 so that the battery temperature can be maintained in a preferred temperature range. In another example, an optimum fashion may strive to first satisfy the immediate needs of the user over charging the battery; like powering the vehicle HVAC system when the user is in the vehicle during charging on an extremely hot/cold day. The aforementioned examples are only some of the possible scenarios that may constitute an "optimum fashion," as numerous others certainly exist. These and other considerations can be affected by predetermined priorities (e.g., priorities set during the design and/or manufacturing phase), which are generally unrelated to current vehicle conditions. An engineering team may determine, for example, that battery life is the most important factor and establish this as a predetermined priority. Current vehicle conditions (e.g., the current temperature and/or SOC of battery pack 70, etc.) may also play a part in these considerations, as will be subsequently explained. Accordingly, exemplary method 200 may take into account predetermined priorities, current vehicle conditions and/or other factors when allocating or distributing power to the various vehicle systems 20-28.

Beginning with step 202, the method determines if the plug-in electric vehicle is connected to external power source 12. This step may be performed in one of any number of different ways and may sense one or more conditions pertaining to external power source 12 and/or the charging process in order to do so. For instance, if sensors 62 in battery charger 14 detect a current or voltage that exceeds a certain threshold, this step may conclude that external power source 12 is properly connected to battery charger 14 and is available to provide power. Other techniques for determining a connection with external power source 12 may also be used.

Step 204 determines the overall available power to the plug-in electric vehicle from external power source 12. In an exemplary embodiment, a current reading is obtained from power coupling 50 and a voltage reading is obtained from the same power coupling and/or sensors 62; these two readings are then multiplied together to estimate the overall available power from external power source 12. Power couplings that conform to the SAE J-1772 and J-1773 standards are generally capable of providing this type of current reading. Of course, steps 202 and 204 may be combined into a single step that determines both the presence and amount of overall available power. It is possible for these readings to be provided to battery charging control module 30, control unit 64, or to some other device for processing. Even though power coupling 50 and sensors 62 are previously described, it should be appreciated that power coupling 50 and sensors 62 may include any electrodynamic, electronic, digital, analog or other devices such as power meters, energy meters, watt meters, ammeters, voltmeters, etc. Other techniques for determining the overall available power from external power source 12 may also be used.

Next, step 206 determines the overall power requested by one or more vehicle systems 20-28 from external power source 12. Here, a distinction should be made between required power and requested power. "Required power" generally refers to the minimum amount of power needed for a particular high voltage vehicle system 20-28 to successfully function or operate. In one embodiment, the required power may be determined through lookup or empirical tables established at a design and/or manufacturing phase. Meanwhile, "requested power" generally refers to the preferable or desired power needed by a particular high voltage vehicle system 20-28 in order to achieve the tasks that have been requested of them. The required power is generally less than or equal to the requested power. Consider the example where, during a hot summer day a user is sitting in a plug-in electric vehicle while it is charging and switches an HVAC device to a high setting. The required power may pertain to the minimum amount of power required to successfully operate cabin thermal system 24 at its lowest setting; the requested power may pertain to the amount of power required to operate cabin thermal system 24 at the high setting requested by the user.

According to an exemplary embodiment, step 206 determines the overall requested power by summing together the individual requested power for each of the vehicle systems 20-28. This provides the method with the overall amount of power being requested by all of the vehicle systems 20-28 together and provides it with the amount of power being requested by each individual system. For example, if high voltage battery unit 20 asks for 1,500 W for charging the battery, battery thermal system 22 asks for 1,000 W for maintaining the high voltage battery unit at a certain temperature, cabin thermal system 24 asks for 750 W for powering the vehicle's HVAC system, APM 26 asks for 250 W for operating one or more low voltage devices such as the various control units, and no additional high voltage vehicle system 28 requests power, then the overall requested power is 3,500 W. These requests may be in the form of electronic messages sent from the respective control units of vehicle systems 20-28 to battery charging control module 30 over low voltage bus 42, or some other form. In some cases, a default value may be used to determine the amount of power being requested by a certain high voltage vehicle system; for example, it may be assumed that APM 26 requires 250 W of power instead of the APM actually sending a request for such power. Of course, these are only some of the ways in which step 206 could determine the overall requested power, as other techniques could be used instead.

Next, step 208 determines if the overall requested power exceeds the overall available power. In one embodiment, battery charging control module 30 simply compares the overall available power to the overall requested power to make this determination. If the overall requested power does not exceed the overall available power, then the method may proceed to step 210 and vehicle systems 20-28 are simply provided with the power that they requested. In this scenario, external power source 12 has enough power to fully satisfy all of the requests, including charging high voltage battery unit 20, and thus allocating or apportioning the power is not necessary. If the overall requested power does exceed the overall available power, then the method continues with step 212. Consider the example above where the overall requested power is 3,500 W; if the overall available power is only 1,500 W, then the method would proceed to step 212.

Step 212 determines an individual modified power for each of the vehicle systems 20-28 that are asking for power. Step 212 may use an allocation or apportionment process (also referred to as costing) to determine the individual modified power values for the various vehicle systems. Since there is not enough available power from external power source 12 to meet all of the power demands, the amount of power requested by each high voltage vehicle system 20-28 has to be modified in order to accommodate the limited power resources. In an exemplary embodiment, step 212 uses a multistep process that includes: identifying those vehicle systems 20-28 that are turned 'on' and are in need of power (some vehicle systems may be turned 'off' or not requesting any power); assigning a first weighted value to the vehicle systems 20-28 that are requesting power, where the first weighted value is influenced by one or more predetermined priorities; and assigning a second weighted value to those vehicle systems, where the second weighted value is influenced by one or more current vehicle conditions. These and other factors may be used to calculate an individual modified power for each of the vehicle systems 20-28, which in turn can affect the overall allocation or distribution of power. This multistep process is illustrated through the following example.

Consider the exemplary case where a plug-in electric vehicle is being charged and: i) a person is sitting in the vehicle with the air conditioning on, ii) the following predetermined priorities have been selected (high voltage battery unit 20 gets 50% of the available power, battery thermal system 22 gets 30% of the available power, and cabin thermal system 24 and APM 26 each get 10% of the available power), iii) the following current vehicle conditions have been detected (high voltage battery unit 20 has an SOC value of 80% and a battery temperature of 35° C., and the outside temperature is 10° C. higher than that requested by the user from the air conditioner), and iv) the various vehicle systems 20-28 are requesting the amounts of power used in the example above. In a first step, each of the vehicle systems 20-28 is queried to determine if they are 'on' and how much power they need. In one embodiment, the control unit in each of the vehicle systems 20-28 sends an electronic message to battery charging control module 30 that includes the individual requested power (e.g., high voltage battery unit 20 requests 1,500 W, battery thermal system 22 requests 1,000 W, cabin thermal system 24 requests 750 W, APM 26 requests 250 W, and system 28 requests 0 W). It is also possible for battery charging control module 30 to use predetermined values and assume that a particular system, like APM 26, needs a certain amount of power instead of actually querying it.

In a second step, a first weighted value is assigned to each of the vehicle systems 20-26 (a process sometimes referred to as costing), where the first weighted value is influenced by one or more of the predetermined priorities. In this case, the first weighted value for high voltage battery unit 20 is '5' (corresponds to 50% of the available power), the weighted value for battery thermal system 22 is '3' (corresponds to 30%), and the weighted values for cabin thermal system 24 and APM 26 are '1' (corresponds to 10%). Generally, the first weighted values assigned here are not impacted by current vehicle conditions inside or outside of the vehicle, but instead are influenced by predetermined priorities, such as those described above. It should be appreciated that the predetermined priorities could be programmable; that is, they could be changed or adjusted over time instead of being statically set during design and/or manufacture, or they could be static.

In a third step, a second weighted value is assigned to each of the vehicle systems 20-26, where the second weighted value is influenced by one or more current vehicle conditions. The second weighted value is intended to address situations where the current conditions occurring at or around the vehicle require modification to the predetermined priorities, which are more directed to an 'ideal case scenario'. For instance, in the current example, the following look-up table could be used to evaluate the SOC of battery pack 70 and assign a second weighted value accordingly.

TABLE I

| Battery Pack SOC | Second Weighted Value |
| --- | --- |
| 90-100% | 1 |
| 70-90% | 2 |
| 50-70% | 5 |
| 0-50% | 10 |

As demonstrated in Table I, the higher the SOC of battery pack 70, the lower the second weighted value; this is because a battery pack already having a high level of charge does not need as much power as one having a much lower level of charge. A greater portion of the overall available power is provided to high voltage battery unit 20 when it has a low SOC than when it has a high SOC. Once the SOC goes below 50%, Table I assumes that the battery pack needs all the energy that it can receive and thus assigns it a second weighted value of '10'. In the example above, battery pack 70 has an SOC of 80% which would translate into a second weighted value of '2'. Any number of different look-up tables could be used for this step and, in one embodiment, a separate look-up table is used for each of the current vehicle conditions or parameters that is being monitored. For example, Table II could be used to evaluate the temperature of battery pack 70 and assign a second weighted value accordingly.

TABLE II

| Battery Pack Temp | Second Weighted Value |
| --- | --- |
| <0° C. | 10 |
| 0-10° C. | 5 |
| 10-20° C. | 1 |
| 20-30° C. | 3 |
| 30-40° C. | 5 |
| >40° C. | 10 |

As shown in Table II, the preferred temperature range for exemplary battery pack 70 is between 10-20° C.; in this temperature range there is not a great need to supply battery thermal system 22 with power because the battery unit is already at a desirable temperature. As the battery temperature moves away from this preferred range, either hotter or colder, the second weighted value goes up because battery thermal system 22 needs more power to maintain the battery at its desired thermal condition. In the example above, battery pack 70 has a temperature of 35° C. which would translate into a second weighted value of '5'. Other current vehicle conditions, in addition to those in Tables I and II, that could be monitored and used to assign second weighted values include but are certainly not limited to, battery state of health (SOH), battery temperature, battery charger temperature, ambient temperature, vehicle cabin temperature, as well as any other condition or parameters detected by sensors 62, 72, 82, 92, 102. These current vehicle conditions or parameters may provide an insight into the present state of the various vehicle systems 20-28 and could have their own look-up tables, etc. The various look-up tables used in this step may be stored and maintained at battery charging control module 30, any of the control units 74, 84, 94, 104, or at any other suitable device.

It should be understood that the examples discussed above are only provided for purposes of illustration and are in no way meant to limit the present invention. For example, the actual values used could vary significantly from those provided above; the current vehicle conditions used could be absolute values (e.g., actual temperatures) or they could be relative values (e.g., temperature differences, temperature ratios, rates of temperature change, etc.); the weighted values could be static values set at design and/or manufacturing or they could be dynamic values occasionally updated and or changed (e.g., updated via wireless downloads, updated at the vehicle through fuzzy logic, a neural network, etc.); the weighted values do not have to be integers, but instead could be fractions, percentages or any other numerical value; the entity used to correlate a current vehicle condition to a weighted value could be something other than a two-dimensional look-up table (e.g., it could be a three- or four-dimensional look-up table where each high voltage vehicle system 20-28 is assigned a single second weighted value based on two or three current vehicle conditions or parameters, it could be an algorithm instead of a look-up table, etc.); and each high voltage vehicle system 20-28 could be assigned multiple second weighted values (e.g., two or more second weighted values assigned to a single vehicle system could be multiplied together, added together or otherwise combined) or none at all. These are only some of the possibilities, as the second weighted value may be assigned according to any suitable method or technique known in the art.

Now that first and second weighted values have been assigned, step 212 can determine the individual modified power for each high voltage vehicle system 20-28. In one embodiment, the individual modified power for each vehicle system is determined by the following equation:

Individual Modified Power=First Weighted
Value*Second Weighted Value     (Equation 1)

where the first weighted value is influenced by one or more predetermined priorities, and the second weighted value is influenced by one or more current vehicle conditions. A 1$^{st}$ individual modified power is determined for high voltage battery unit 20, a 2$^{nd}$ individual modified power is determined for battery thermal system 22, a 3$^{rd}$ individual modified power is determined for cabin thermal system 24, a 4$^{th}$ individual modified power is determined for APM 26, and so on until an N$^{th}$ individual modified power is determined for the last vehicle system. In the example used above, Equation 1 is calculated as follows (second weighted values have been provided for cabin thermal system 24 and APM 26):

1$^{st}$ Individual Modified Power (High Voltage Battery Unit)=5*2=10

2$^{nd}$ Individual Modified Power (Battery Thermal System)=3*5=15

3$^{rd}$ Individual Modified Power (Cabin Thermal System)=1*5=5

4$^{th}$ Individual Modified Power (APM)=1*10=10

One can see from these equations that battery thermal system 22 is to receive the most amount of power among the various vehicle systems 20-28. This is true even though the predetermined priorities have high voltage battery unit 20 receiving 50% of the available power, while battery thermal system 22 is only to receive 30% of the available power. This is due to the second weighted value. Because high voltage battery unit 20 is already almost fully charged (SOC of 80%), it does not require as much power for charging; however, the battery temperature is 35° C. which is outside of the desired temperature range by a fair amount. Thus, the percentage or portion of the overall available power delivered to battery thermal system 22 in order to keep the battery cool is increased; this is an example of current vehicle conditions affecting the allocation of power among the vehicle systems 20-28. It should be appreciated that other techniques of computation may be used. For instance, an additional element of '0' and '1' could be added to Equation 1, where a '1' is used for vehicle systems that are turned 'on' and a '0' is used for vehicle systems that are turned 'off' or not requesting power. If the vehicle system is turned off, then this additional element would make the entire product '0'. Also, the first and second weighted values could be combined into a single weighted value; or additional weighted values and/or other factors could be used in the calculations of step 212.

Next, step 214 adds together the individual modified power for each of the plurality of vehicle systems 20-28 to determine an overall modified power, as shown in equation 2.

Overall Modified Power=(1$^{st}$ Individual Modified Power+2$^{nd}$ Individual Modified Power+ . . . +N$^{th}$ Individual Modified Power)     (Equation 2)

Depending on the particular embodiment, Equations 1 and 2 may be performed by battery charging control module 30, by control units 74, 84, 94, 104, or both. In the example used above, Equation 2 is calculated as follows:

Overall Modified Power=10+15+5+10=40

Step 216 then uses the individual modified power for each of the vehicle systems 20-28 (determined in step 212) and the overall modified power (determined in step 214) to determine how much power each of the vehicle systems is to receive from the external power source. Put differently, now that the modified or weighted amount of power for each high voltage vehicle system 20-28 has been calculated, step 216 can determine the percentage or portion of the overall available power that is to be allocated to each vehicle system. In one embodiment, each individual modified power is divided by the overall modified power to obtain a modified power portion, as shown in Equation 3.

Modified Power Portion=Individual Modified Power/
Overall Modified Power     (Equation 3)

In the example used above, Equation 3 is calculated as follows:

1$^{st}$ Modified Power Portion=10/40=0.250

2$^{nd}$ Modified Power Portion=15/40=0.375

3$^{rd}$ Modified Power Portion=5/40=0.125

4$^{th}$ Modified Power Portion=10/40=0.250

The modified power portion for each vehicle system 20-28 may then be multiplied by the overall available power that was previously determined; this results in a modified power amount, which is the actual amount of power to be allocated or apportioned to the various vehicle systems.

Modified Power Amount=Modified Power
Portion*Overall Available Power     (Equation 4)

In the example used above, Equation 4 is calculated as follows:

1$^{st}$ Modified Power Amount=0.250*1,500 W=375 W

2$^{nd}$ Modified Power Amount=0.375*1,500 W=562.5 W

3$^{rd}$ Modified Power Amount=0.125*1,500 W=187.5 W

4$^{th}$ Modified Power Amount=0.250*1,500 W=375 W

It is evident from these values that the actual amount of power distributed to vehicle systems 20-28 is less than the amounts that they requested (e.g., high voltage battery unit 20 requested 1,500 W but is only provided with 375 W; battery thermal system 22 requested 1,000 W but is only provided with 562.5 W, etc.). In some instances, it is possible for a vehicle system to be allocated more energy than it requested; such as the case with APM 26 in the example above. There are a number of techniques that could be used to address such a situation, including one where the individual requested power for that vehicle system is simply subtracted from the overall available power right off of the top so that the new overall available power is less by that amount. In the present example, 250 W (individual requested power for APM 26) could be subtracted from the overall available power of 1,500 W, which results in a new overall available power of 1,250 W. In this case, method 200 may assume that the APM is to receive the full 250 W of power that were requested and treat all subsequent calculations involving the overall available power as being less that amount (i.e., overall available power now equals 1,250 W). This technique is optional and may be used with any number of other vehicle systems as well, particularly those where the individual requested power is an assumed or predetermined amount.

The method, steps, techniques, procedures, etc. described above may be performed or executed by any number of different devices, including battery charging control module 30, control units 64, 74, 84, 94, 104, or other devices such as vehicle integration control module, battery pack/inverter control module, domain module, body control module, etc.

Moreover, the exemplary embodiment provided above is only an illustrative example, as the present system and method may use any number of different combinations and sequences of steps, including those having less, more or different steps than described in this embodiment. In addition, the modified power amounts can be further adjusted to accommodate for losses during power distribution, power fluctuations, or other real life scenarios.

Step 218 distributes the overall available power to the various vehicle systems 20-28 according to the allocation or apportionment previously determined. There are a number of different ways this may be carried out. Two examples include passive allocation where the overall available power is put onto high voltage circuit 40 so that each vehicle system 20-28 can passively draw or take its allocated amount, and active allocation where battery charger 14 or some other device actively distributes the allocated amounts to the different vehicle systems. According to an exemplary passive allocation embodiment, battery charger 14 provides high voltage circuit 40 with the entire amount of overall available power, from which systems 20-28 draw their apportioned amounts of power. The specific amounts of power drawn may be dictated by control messages sent from battery charging control module 30 to the individual control units 74, 84, 94, 104 of the vehicle systems, for example. In an exemplary active allocation embodiment, battery charger 14 receives a control message from battery charging control module 30 instructing it on how to allocate or distribute the power to the different vehicle systems 20-28. With this information, battery charger 14 actively allocates the specific power to the vehicle systems, as opposed to the vehicle systems drawing or taking their allocations, as in the passive example. The switching power supply 56 in battery charger 14 may be used with this process. In yet another embodiment, battery charger 14 could provide all of the overall available power to high voltage battery unit 20 first, from which the power could be properly allocated to the other vehicle systems. These are only some of the possible techniques that can be used to allocate or distribute power as others will become apparent to those skilled in the art.

Method 200 could continue to loop or cycle so long as the plug-in electric vehicle was still being charged.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For instance, the particular sequence or combination of steps in exemplary method 200 may be altered; method 200 may be used in a regenerative charging process as opposed to being used only with an external power source 12; method 200 may include some type of manual user override in the event that a user wanted to override the allocation or distribution determined by the method, etc. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A method for charging a plug-in electric vehicle with an external power source, comprising the steps of:
   (a) determining an overall available power that is available from the external power source, wherein the overall available power is determined by obtaining a current reading from a component that is directly or indirectly connected to the external power source and using the current reading in the determination of the overall available power;
   (b) determining an overall requested power that is requested by a plurality of vehicle systems within the plug-in electric vehicle, wherein the plurality of vehicle systems are located within the same plug-in electric vehicle and include a high voltage battery unit and at least one thermal system; and
   (c) determining if the overall requested power exceeds the overall available power, and if the overall requested power does exceed the overall available power then allocating the overall available power from the external power source to the plurality of vehicle systems according to an allocation process that considers a first weighted value influenced by one or more predetermined priorities and a second weighted value influenced by one or more current vehicle conditions, wherein the amount of power that is distributed to the high voltage battery unit and the at least one thermal system is impacted by both the first and second weighted values.

2. The method of claim 1, wherein step (a) further comprises determining the overall available power by obtaining a current reading and a voltage reading and multiplying the two readings together, wherein the current reading is obtained from a power coupling that connects the external power source to the plug-in electric vehicle.

3. The method of claim 1, wherein step (b) further comprises determining the overall requested power by obtaining an individual requested power from each of the plurality of vehicle systems and adding them together, wherein each individual requested power is sent in an electronic message from one of the plurality of vehicle systems to a battery charging control module.

4. The method of claim 1, wherein step (b) further comprises determining the overall requested power that is requested by a plurality of vehicle systems, wherein at least one of the vehicle systems is selected from the group consisting of: a high voltage battery unit, a battery thermal system, a cabin thermal system, and an accessory power module (APM).

5. The method of claim 1, wherein if the overall requested power does not exceed the overall available power, then step (c) further comprises providing the plurality of vehicle systems with the power that they requested.

6. The method of claim 1, wherein if the overall requested power does exceed the overall available power, then step (c) further comprises determining an individual modified power for each of the plurality of vehicle systems, wherein the process for determining the individual modified power comprises the steps of:
   (i) assigning a first weighted value to each of the plurality of vehicle systems, wherein the first weighted value is influenced by one or more predetermined priorities; and (ii) assigning a second weighted value to each of the plurality of vehicle systems, wherein the second weighted value is influenced by one or more current vehicle conditions.

7. The method of claim 6, wherein the process for determining the individual modified power for each of the plurality of vehicle systems further comprises multiplying the first and second weighted values together.

8. The method of claim 6, wherein the one or more predetermined priorities are determined at a design and/or manufacturing phase and are stored in a battery charging control module.

9. The method of claim 6, wherein the one or more current vehicle conditions are determined by sensors within a battery charging system and are provided to a battery charging control module.

10. A method for charging a plug-in electric vehicle with an external power source, comprising the steps of:
(a) determining an overall available power that is available from the external power source;
(b) determining an overall requested power that is requested by a plurality of vehicle systems; and
(c) determining if the overall requested power exceeds the overall available power, and if the overall requested power does exceed the overall available power then allocating the overall available power from the external power source to the plurality of vehicle systems by a process that includes the steps of:
(i) determining an individual modified power for each of the plurality of vehicle systems;
(ii) adding together the individual modified powers for the plurality of vehicle systems to determine an overall modified power; and
(iii) using the individual modified power for each of the plurality of vehicle systems and the overall modified power to determine how much power each of the plurality of vehicle systems is to receive from the external power source.

11. The method of claim 10, wherein step (iii) further comprises dividing each of the individual modified powers by the overall modified power to determine a modified power portion for each of the plurality of vehicle systems, and multiplying each of the modified power portions by the overall available power to determine how much power each of the plurality of vehicle systems is to receive from the external power source.

12. A method for charging a plug-in electric vehicle with an external power source, comprising the steps of:
(a) determining an overall available power that is available from the external power source;
(b) determining an overall requested power that is requested by a plurality of vehicle systems within the plug-in electric vehicle, wherein the plurality of vehicle systems includes a high voltage battery unit, a battery thermal system and a cabin thermal system; and
(c) determining if the overall requested power exceeds the overall available power, and if the overall requested power does exceed the overall available power then distributing the overall available power to the plurality of vehicle systems including the high voltage battery unit, the battery thermal system and the cabin thermal system all located within the same plug-in electric vehicle, wherein the amount of power that is distributed to each of the high voltage battery unit, the battery thermal system and the cabin thermal system is influenced by a predetermined priority and/or a current vehicle condition and is designed to charge the high voltage battery quickly while also controlling thermal aspects of the high voltage battery and an interior cabin of the plug-in electric vehicle.

13. The method of claim 12, wherein if the overall requested power does not exceed the overall available power, then step (c) further comprises providing the plurality of vehicle systems with the power that they requested.

14. The method of claim 12, wherein if the overall requested power does exceed the overall available power, then step (c) further comprises determining an individual modified power for each of the plurality of vehicle systems, wherein the process for determining the individual modified power comprises the steps of:
(i) assigning a first weighted value to each of the plurality of vehicle systems, wherein the first weighted value is influenced by one or more predetermined priorities; and
(ii) assigning a second weighted value to each of the plurality of vehicle systems, wherein the second weighted value is influenced by one or more current vehicle conditions.

15. The method of claim 14, wherein the process for determining the individual modified power for each of the plurality of vehicle systems further comprises multiplying the first and second weighted values together.

16. A method for charging a plug-in electric vehicle with an external power source, comprising the steps of:
(a) determining an overall available power that is available from the external power source;
(b) determining an overall requested power that is requested by a plurality of vehicle systems, wherein the plurality of vehicle systems includes a high voltage battery unit and a battery thermal system; and
(c) determining if the overall requested power exceeds the overall available power, and if the overall requested power does exceed the overall available power then distributing the overall available power to the plurality of vehicle systems, wherein the amount of power that is distributed to each of the plurality of vehicle systems is influenced by a predetermined priority and/or a current vehicle condition according to an allocation method that includes the steps of:
(i) determining an individual modified power for each of the plurality of vehicle systems;
(ii) adding together the individual modified powers for the plurality of vehicle systems to determine an overall modified power; and
(iii) using the individual modified power for each of the plurality of vehicle systems and the overall modified power to determine how much power each of the plurality of vehicle systems is to receive from the external power source.

17. The method of claim 16, wherein step (iii) further comprises dividing each of the individual modified powers by the overall modified power to determine a modified power portion for each of the plurality of vehicle systems, and multiplying each of the modified power portions by the overall available power to determine how much power each of the plurality of vehicle systems is to receive from the external power source.

18. The method of claim 1, wherein if the overall requested power does exceed the overall available power, then step (c) further comprises allocating the overall available power from the external power source to the plurality of vehicle systems including a high voltage battery unit by using a costing process that apportions power between the plurality of vehicle systems including the high voltage battery unit based, at least partially, on a predetermined priority and a current condition of the high voltage battery unit.

19. The method of claim 1, wherein if the overall requested power does exceed the overall available power, then step (c) further comprises allocating the overall available power from the external power source to the plurality of vehicle systems including an accessory power module (APM), wherein the APM is allocated an amount of power that is equal to or greater than the amount of power the APM requested and each of the remaining vehicle systems is allocated an amount of power that is less than the amount of power each of the remaining vehicle systems requested.

20. The method of claim 1, wherein if the overall requested power does exceed the overall available power, then step (c) further comprises allocating the overall available power from the external power source to the plurality of vehicle systems using a passive allocation process where the overall available power is put onto a high voltage circuit within the plug-in electric vehicle so that each of the plurality of vehicle systems can passively draw its allocated amount of power as dictated by a control message received by each of the plurality of vehicle systems.

21. The method of claim 1, wherein if the overall requested power does exceed the overall available power, then step (c) further comprises allocating the overall available power from the external power source to the plurality of vehicle systems using an active allocation process where a battery charger actively distributes the allocated amounts of power to the plurality of vehicle systems as dictated by a control message received by the battery charger.

* * * * *